United States Patent [19]

Nanba et al.

[11] Patent Number: 4,696,193
[45] Date of Patent: Sep. 29, 1987

[54] AIRFLOW RATE MEASURING APPARATUS OF KARMAN VORTEX TYPE

[75] Inventors: Sinzi Nanba, Kariya; Kazuma Matsui, Toyohashi; Toru Mizuno, Aichi; Tukasa Goto, Toyota, all of Japan

[73] Assignee: Nippondenso Co., Ltd., Kariya, Japan

[21] Appl. No.: 804,848

[22] Filed: Dec. 5, 1985

[30] Foreign Application Priority Data

Dec. 5, 1984 [JP] Japan ................................ 59-256829

[51] Int. Cl.$^4$ .............................................. G01F 1/32
[52] U.S. Cl. .................................................. 73/861.22
[58] Field of Search ................. 73/861.22, 861.24, 198

[56] References Cited

U.S. PATENT DOCUMENTS

| 3,116,639 | 1/1964 | Bird | 73/861.22 |
| 3,937,195 | 2/1976 | Woods | 73/861.22 |
| 3,996,796 | 12/1976 | Adler et al. | 73/861.22 |
| 4,116,060 | 1/1978 | Frederick . | |
| 4,350,047 | 9/1982 | Dewey, Jr. et al. | 73/861.22 |
| 4,397,192 | 8/1983 | Mollet | 73/861.22 |
| 4,485,679 | 12/1984 | Pitt | 73/861.22 |

FOREIGN PATENT DOCUMENTS

| 55-51311 | 8/1980 | Japan . |
| 57-67863 | 3/1982 | Japan . |
| 58-144712 | 4/1983 | Japan . |

Primary Examiner—Herbert Goldstein
Attorney, Agent, or Firm—Cushman, Darby & Cushman

[57] ABSTRACT

A columnar vortex generator is set in a duct communicating with an intake pipe of an engine, to extend across the airflow in the duct. A vortex sensor is arranged in a downstream surface of the vortex generator. The sensor generates a signal corresponding to the frequency of Karman vortexes generated at the downstream side of the vortex generator. A turbulence generator for generating a turbulent flow in that part of intake air flowing against the vortex generator is set at the upstream side of the vortex generator. The vortex generator consists of stationary and movable units. The movable unit is moved in accordance with elongation/contraction of a bellows so as to vary the typical dimension D of the surface of the vortex generator against which air flows.

14 Claims, 3 Drawing Figures

AIRFLOW RATE MEASURING APPARATUS OF KARMAN VORTEX TYPE

BACKGROUND OF THE INVENTION

The present invention relates to an airflow rate measuring apparatus of the Karman vortex type which can effectively measure the air intake of an engine, and, more particularly, to an airflow rate measuring apparatus of the Karman vortex type which can effectively measure the weight flow rate rather than the volume flow rate of intake air flowing into an intake pipe.

The airflow rate measuring apparatus of a Karman vortex comprises a vortex generator of a column-like shape set across the inside of a duct in which air to be measured flows. When an airflow is present in the duct, the vortex generator generates vortexes at the downstream side. The airflow rate in the duct is measured utilizing the principle that the vortex generating frequency is proportional to the airflow speed. More specifically, a vortex detection element of the heated wire type is set in a downstream side surface of the vortex generator. The detection element detects the vortex generating frequency so as to calculate the airflow rate in the duct.

Since the resistance component interfering with airflow is relatively small in an airflow rate measuring apparatus of the Karman vortex type as described above, the apparatus can effectively measure the flow rate of the intake air of an engine.

In such an apparatus, operation of the vortex generator is preferably stable so that the vortex generating frequency will be linear to the airflow rate within a wide range of measurement. Ideally, the coefficient of resistance should also be small. In order to satisfy these requirements, various studies have been made as to the shape of the vortex generator and the like. However, a vortex generator satisfying all desired characteristics has not yet been devised.

In this type of apparatus the vortex generating frequency is proportional to the airflow speed. Therefore, the Karman vortex frequency represents the volume flow of air. However, the intake airflow rate measuring apparatus of a combustion engine is required to measure not the volume flow but the weight flow. Therefore, a measurement signal corresponding to the Karman vortex frequency cannot be directly used as an intake airflow rate measurement signal.

In view of the above, in U.S. patent application Ser. No. 739,004, previously proposed by the present applicant, the typical dimension of the surface of a vortex generator facing an airflow is varied in correspondence with the aspect of the airflow to be measured, e.g., air pressure, so that the measurement output reflects a state of air density. In this manner, a Karman vortex frequency is generated in correspondence with the weight airflow rate.

When the typical dimension of a vortex generator is varied in correspondence with the air density, the shape of the vortex generator is limited. For example, a widening effect of the dynamic range of measurement may be limited. Consequently, an improvement in the linearity of the Karman vortex frequency with the flow rate may also be limited.

SUMMARY OF THE INVENTION

It is an object of the present invention to provide an airflow rate measuring apparatus of the Karman vortex type which can stably generate a Karman vortex having a good linearity with an airflow rate, independent of the shape of the vortex generator.

It is another object of the present invention to provide an airflow rate measuring apparatus of the Karman vortex type which can both stably generate a Karman vortex and widen the measurement dynamic range even if the airflow speed is low.

It is still another object of the present invention to provide an airflow rate measuring apparatus of the Karman vortex type which can control stable generation of a Karman vortex even if a Karman vortex is generated in correspondence with a weight flow rate, corresponding to the airflow speed, and not a volume flow rate, and which can be effectively utilized as, for example, an airflow rate intake measuring apparatus for an engine.

According to an airflow rate measuring apparatus of the Karman vortex type, a turbulence generator is arranged at the upstream side of a vortex generator set in an airflow. The turbulence generator generates a turbulent flow against the vortex generator so as to obtain a uniform state of air near the vortex generator irrespective of the airflow speed.

When such a turbulence generator is set at the upstream side of the vortex generator, a turbulent flow is generated in the air flowing toward the vortex generator. The flow of air toward the vortex generator is moderated and the resistance coefficient of the vortex generator is effectively decreased. In addition, the airflow passing on either side of the vortex generator meet at the rear of the vortex generator and form a uniform airflow, regardless of their speeds when separated. Therefore, the Karman vortex frequency has a good linearity with the airflow rate. When the airflow speed is low, a turbulent flow is generated in the air in front of the vortex generator. The turbulent flow effectively serves to trigger a Karman vortex to stably generate a vortex at the downstream side of the vortex generator and to allow measurement within a wide dynamic range.

Generation of such a Karman vortex is scarcely influenced by the shape of the vortex generator. When the typical dimension of a vortex generator is varied by the air density, the airflow weight can be determined in accordance with the Karman vortex frequency. Karman vortexes can be stably generated irrespective of such changes in the typical dimension. The apparatus of the present invention can therefore be effectively utilized as an intake airflow rate measuring apparatus of an engine.

DETAILED DESCRIPTION OF THE PREFERRED EMBODIMENT

Figure 1:
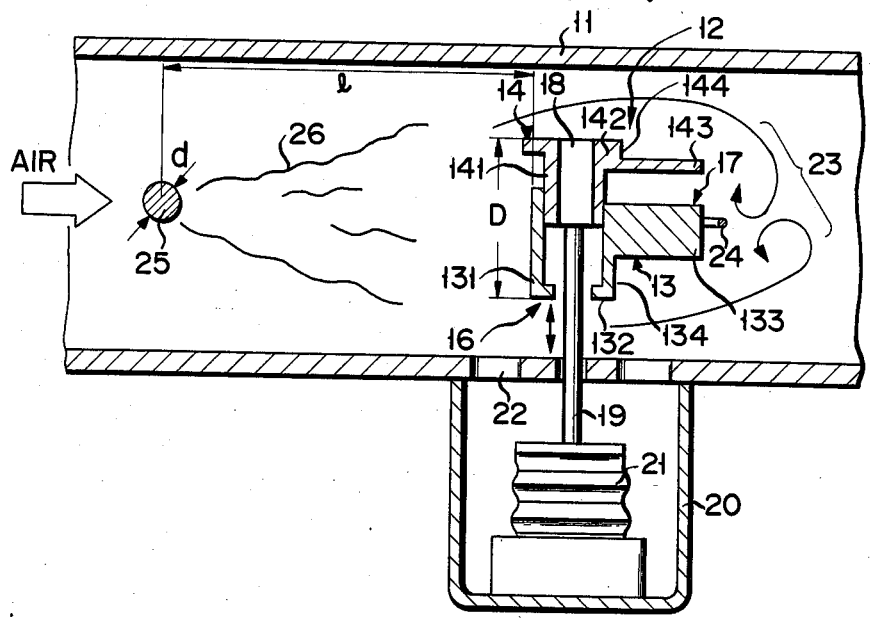
FIG. 1 is a sectional view of a vortex generator in an airflow rate measuring apparatus of the Karman vortex type according to an embodiment of the present invention.

An airflow to be measured is present in a duct 11 as shown in FIG. 1. The duct 11 is connected to an intake pipe of an engine, and an intake airflow passes therethrough. A columnar vortex generator 12 is fixed across the interior of the duct 11.

The vortex generator 12 consists of a stationary unit 13 and a movable unit 14. The units 13 and 14 are split into front elements 131 and 141 and rear elements 132 and 142. The elements 141 and 142 of the unit 14 are coupled together by a connecting member.

The movable unit 14 is inserted between the elements 131 and 132 of the unit 13 so as to overlap unit 13. When the unit 14 is moved along the unit 13, the typical dimension D of an area of the vortex generator 12 facing an airflow in the duct 11 is changed.

The elements 131 and 141 of the units 13 and 14, respectively, comprise plates which face the airflow. The elements 131 and 141 overlap each other so as to provide a single plate having the typical dimension D facing the airflow. The obtained single plate faces the airflow perpendicularly in the duct 11.

The elements 132 and 142 of the units 13 and 14 also have the typical dimension D. The elements 131 and 142 have tail portions 133 and 143 at their downstream sides in the direction of the airflow. The tail portions 133 and 143 are defined by steps 134 and 144 so that the tail portions 133 and 143 are narrower than the typical dimension D.

The dimension D of the vortex generator 12 is varied by moving the movable unit 14. The elements 131 and 141 and the elements 132 and 142 serve to split the vortex generator 12 into front and rear vortex generators 16 and 17. A small gap 18 perpendicularly communicating with the airflow in the vortex generator 12 is defined between the front and rear vortex generators 16 and 17.

In the unit 14, consisting of the elements 141 and 142, a shaft 19 extends in the moving direction of the unit 14. When the shaft 19 moves in the direction indicated by the arrow, the unit 14 is moved along the unit 13 and the typical dimension D is varied. The shaft 19 extends into an air chamber 20, formed at the side of the duct 11, through the wall of the duct 11. The shaft 19 is connected to a bellows 21 set in the air chamber 20. The shaft 19 is driven by elongation/contraction of the bellows 21. When the bellows 21 is elongated, the unit 14 is moved in such a direction as to increase the dimension D.

The bellows 21 is arranged to provide a hermetically sealed chamber. The air chamber 20 communicates with the interior of the duct 11 through an opening 22 so that the chamber and the duct are set at the same air pressure. As a result, the bellows 21 is controlled in accordance with the variation in air density inside the duct 11. When the air density is low, the typical dimension D of the vortex generator 12 is increased.

A vortex sensor 24 using a heated wire is arranged in a downstream side surface of the tail portion 133 of the unit 13 and detects a Karman vortex string 23 generated at the downstream side of the vortex generator 12. The sensor 24 comprises, for example, a resistive wire. This wire is heated by the electrical power supplied to it, and is exposed to the Karman vortex string 23. Its resistance changes in accordance with its temperature and its heat dissipation efficiency changes with the airflow to which the wire is exposed. In other words, it periodically varies as Karman vortexes pass the wire one after another. The electrical power supplied to the wire is controlled such that the wire has a constant temperature and, thus, a constant resistance. The current of the electrical power, therefore, periodically changes in accordance with the frequency of the Karman vortex. Hence, the Karman vortex frequency is determined by detecting periodical changes in the current.

In an apparatus generating a Karman vortex, the vortex generating frequency f of the Karman vortex string 23 satisfies:

$$f = St \times (U \times D) \quad (1)$$

where
St : the strouhal number
U : airflow speed in the duct 11
The number St is determined by the shape of the vortex generator 12 and the shape of the duct 11 which is provided near the vortex generator 12.

As can be seen from relation (1), the volume flow rate Q of air inside the duct 11 is calculated by measuring the Karman vortex frequency f. When the cross-sectional area of the duct 11 is represented by A, the volume flow rate Q is given by:

$$Q = A \cdot U = \{(A \times D)/St\} \times f \quad (2)$$

The bellows 21 has a gas sealed therein which has an internal volume V1 given by:

$$V1 = n1 \times R \times T1/P1 \quad (3)$$

The internal gas volume V1 of the bellows 21 varies in accordance with the temperature T1 and pressure P1 of the sealed gas. Note that n1 is the mole number of the sealed gas, and R is the gas constant. The temperature T1 and pressure P1 are influenced by the temperature T and the pressure P of the air flowing in the duct 11, and change in state in accordance with the air inside the duct 11. The typical dimension D of the vortex generator 12 changes as given by: T,0100X
where A1 is the cross-sectional area of the bellows 21 and K1 is a proportionality constant.

Since the density $\sigma$ of air in the duct 11 is given by:

$$\sigma = P/(R \times T) \quad (5)$$

from equation (2), the weight flow rate G in the duct 11 is given by:

$$G = \{P/(R \times T)\} \times \{(A \times D)/St\} \times f \quad (6)$$

Since the typical dimension D of the vortex generator 12 changes as indicated by equation (4), the variables of temperature T and pressure P in equations (4) and (5) cancel each other, and the weight flow rate G is proportional to the vortex frequency f as follows: T,0110X In the above description, the spring constant of the bellows 21 is considered to be negligible. As for the strouhal number St, it changes in accordance with a change in shape of the vortex generator 12. However, within the operating range of the intake air of an engine—a pressure of 500 to 800 mmHg and a temperature of $-40°$ to $100°$ C.—the vortex generator 12 maintains its basic shape without changing notably. Thus, a change in the strouhal number can be considered to be negligible.

More specifically, the typical dimension D of the vortex generator 12 changes in accordance with the temperature T and pressure P of intake air. Thus, the variables, the temperature T and pressure P of the weight flow rate G in equation (6) cancel each other. The vortex generating frequency f of the Karman vortex string 23 is proportional to the weight flow rate of air flowing in the duct 11. Thus a signal detected by the sensor 24 has pulses of a frequency corresponding to the weight flow rate of air flowing in the duct 11.

In this manner, the weight flow rate of the air flowing in the duct 11 is determined by the frequency of Karman vortexes generated by the vortex generator 12, consisting of the stationary and movable units 13 and 14. The Karman vortex is generated when air flows faster on one side of the vortex generator than on the other side of the vortex generator. For instance, when the first airflow flowing on one side is faster than the second air flow flowing on the other side, the negative pressure of the former is higher that that of the latter in the gap 18. As a result, the second airflow rushes into the first airflow at right angles, causing the first airflow to swerve sideways.

Consequently, the first airflow runs to the inner surface of the duct 11. Then, within the duct 11, force is generated, acting on the second airflow. The second airflow has no way out, and is forced back to the steps of the rear element of the vortex generator. The airflow at the steps of the rear element provide the nucleus of a vortex. As the size of the airflow gradually grows at the rear of the vortex generator, the nucleus develops into a strong, stable Karman vortex.

Thereafter, the second airflow runs faster than the first airflow, and its negative pressure becomes higher than that of the first airflow. Hence, the first airflow gushes into the second airflow at right angles, causing the second airflow to swerve sideways. The second airflow eventually generates another Karman vortex in the same way as did the first airflow, as was described in the preceding paragraph. In this way, the first airflow and the second airflow alternately generate the Karman vortexes at a frequency corresponding to the speed of the original airflow.

A turbulence generator 25 is arranged at the upstream side of the vortex generator 12 at a distance l from the vortex generator 12. The turbulence generator 25 comprises a circular or rectangular prism having a diameter d sufficiently smaller than the typical dimension D of the vortex generator 12. The turbulence generator 25 is parallel to the central axis of the vortex generator 12. The turbulence generator 25 may be comprised of one small member for generating a turbulent flow in air.

When an airflow, as indicated by the arrow, is present in the duct 11 and flows against the turbulence generator 25, a small turbulent flow 26 is formed at the downstream side of the turbulence generator 25. In addition, the airflow speed distribution at the downstream side is such that the airflow speed is slow immediately behind the turbulence generator 26 and fast around its two sides. In other words, a turbulent flow is formed in the air in front of the vortex generator 12, and the airflow speed at the central portion (along the axis) in front of the vortex generator 12 decreases. The airflow speed increases around the two sides of the central portion (along the axis) of the vortex generator 12. The turbulent airflow generated in this manner serves to trigger generation of Karman vortexes by the vortex generator 12.

When the airflow speed is slow and the turbulence generator 25 is not used, the ability of the vortex generator 12 is small and Karman vortexes are not stably generated. It is also difficult to correctly detect the Karman vortex frequency. Therefore, high-precision airflow rate measurements cannot be expected when the airflow speed is slow and the dynamic range of measurement is limited.

However, when the turbulence generator 25 is incorporated as described above, a turbulent flow is locally generated in front of the vortex generator 12 and accelerates generation of Karman vortexes. Stable and strong Karman vortexes can be generated in a low airflow speed range.

When the turbulence generator 25 is used, the airflow speed distribution acting on the vortex generator 12 is set, and the speed of air flowing toward the central portion of the vortex generator 12 decreases. Thus, the flow of air directly flowing against the vortex generator 12 is weakened, and the turbulence generator 25 serves to decrease the resistance coefficient of the vortex generator 12. In this manner, the flow of air near the vortex generator 12 is set in a substantially uniform state from a slow to fast airflow speed. Since the airflow is rendered substantially uniform near the vortex generator 12 irrespective of the airflow speed, linearity between the frequency of the Karman vortexes generated at the downstream side of the vortex generator 12 and the airflow rate is improved.

When the shape of the surface of the vortex generator 12, which is in direct contact with the airflow, is, for example, a flat plate having a high resistance coefficient, the air flowing toward the central front portion of the vortex generator 12 is spread outward to the two sides of the generator. The airflow at the vortex generator 12 has a shape close to a streamline shape. That is, the linearity of the frequency of the Karman vortexes, generated by the vortex generator 12, with the airflow rate is improved greatly, and the shape of the vortex generator 12 can be freely selected.

As can be seen from the above, even if the typical dimension D of the vortex generator 12 is varied in accordance with the air density and the weight flow rate is represented by the frequency of Karman vortexes, the turbulence generator 25 effectively serves to widen the dynamic range of measurement and to reduce the resistance coefficient of the vortex generator 12. Moreover, linearity between the airflow rate and the frequency of the Karman vortexes is improved.

Figure 2:
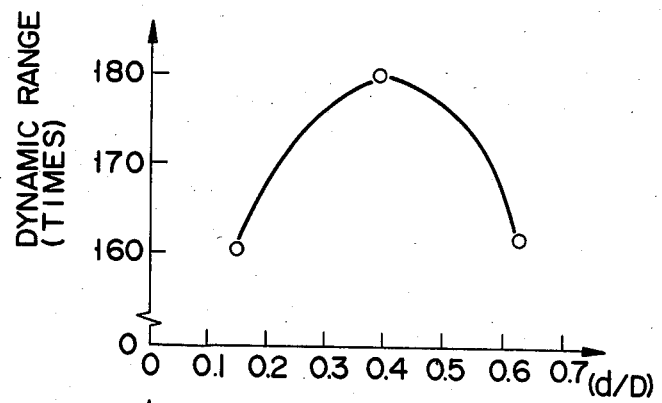
FIG. 2 is a graph showing the dynamic range as a function of the effective measurement area in the vortex generator in the apparatus shown in FIG. 1.

FIG. 2 shows the experimental results obtained for the dynamic range of measurement and the ratio "d/D" of the diameter d of the turbulence generator 25 to the typical dimension D of the vortex generator 12. The dynamic range is widest when the ratio "d/D" is about 0.38.

Figure 3:
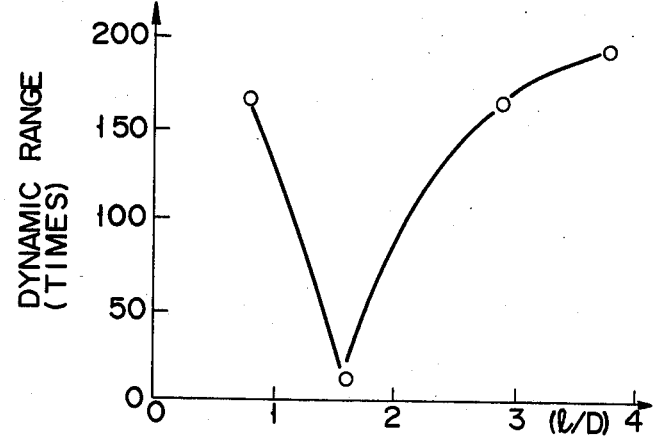
FIG. 3 is a graph showing the dynamic range as a function of the interval between a turbulence generator and a vortex generator in the apparatus shown in FIG. 1.

FIG. 3 shows the experimental results obtained for the dynamic range of measurement and the ratio "l/D" of the distance to the turbulence generator 25 to the typical dimension D. A good effect was obtained when the ratio "l/D" was larger than about 3.

What is claimed is:

1. An airflow rate measuring apparatus of Karman vortex type, comprising:
   a vortex generator which is arranged in an airflow designated for measurement and generates vortexes of a frequency corresponding to an airflow rate at a downstream side thereof;

vortex detecting means, arranged at a downstream side of said vortex generator, for generating an electrical signal corresponding to the frequency of vortexes;

a turbulence generator arranged at an upstream side of said vortex generator at a location corresponding to a central part of the airflow which flows against said vortex generator, said turbulence generator including a rod member having a width smaller than a surface of said vortex generator which faces the airflow so as to decrease the speed of the central part of the airflow flowing against said vortex generator, said vortex generator comprising a columnar member which extends across the airflow and a ratio d/D being about 0.38, where d is a diameter of said rod member and D is the typical dimension along the widthwise direction of the surface of said vortex generator against which air flows, said rod member being parallel to the axis of said vortex generator.

2. An apparatus according to claim 1 wherein a ratio l/D is not less than about 3, where l is a distance between said vortex generator and said turbulence generator and D is the typical dimension along the widthwise direction of the surface of said vortex generator against which the air flows.

3. An apparatus according to claim 1, wherein said vortex generator comprises a stationary unit and a movable unit, said movable unit being movable along said stationary unit, and the typical dimension D of the surface of said vortex generator against which the air flows varying in accordance with the movement of said movable unit.

4. An apparatus according to claim 3, wherein said movable unit constituting said vortex generator is controlled in accordance with an air density of the airflow to be measured, and the typical dimension D decreases when the air density is high.

5. An apparatus according to claim 3, wherein said movable unit constituting said vortex generator is arranged at a position at which the same air pressure of the airflow is to be measured, is connected to a sealed bellows by a coupling member, and is moved to vary the typical dimension D in correspondence with elongation/contraction of said bellows.

6. An apparatus according to claim 5, where said movable unit is moved in a direction to decrease the typical dimension D when said bellows is contracted, and is moved in a direction to increase the typical dimension D when said bellows is elongated.

7. An airflow rate measuring apparatus of Karman vortex type, comprising:

a vortex generator which is arranged in an airflow designated for measurement and generates vortexes of a frequency corresponding to an airflow rate at a downstream side thereof;

vortex detecting means, arranged at the downstream side of said vortex generator, for generating an electrical signal corresponding to the frequency of vortexes; and a turbulence generator arranged at an upstream side of said vortex generator at a location corresponding to a central part of the airflow which flows against said vortex generator said turbulence generator including a rod member having a width smaller than a surface of said vortex generator which faces the airflow so as to decrease the speed of the central part of the airflow flowing against said vortex generator, said vortex generator comprising a stationary unit and a movable unit which is movable along said stationary unit in a direction perpendicular to the airflow, each of said stationary and movable units comprising front and rear units, a gap which communicates perpendicularly with the airflow being defined between said front and rear elements, part of the airflow which passes by a side of said vortex generator being guided to the opposite side through said gap.

8. An apparatus according to claim 7, wherein said stationary unit and said movable unit of said vortex generator forms a columnar structure which extends across the airflow, and said rod member is parallel to an axis of said vortex generator.

9. An apparatus according to claim 7, wherein said stationary unit and said movable unit of said vortex generator forms a columnar structure which extends across the airflow, and a ratio l/D is not less than about 3, where l is a distance between said vortex generator and said turbulence generator and D is the typical dimension along the widthwise direction of the surface of said vortex generator against which the air flows.

10. An apparatus according to claim 7, wherein the typical dimension D of the surface of said vortex generator against which the air flows varies in accordance with the movement of said movable unit.

11. An apparatus according to claim 10, wherein said movable unit constituting said vortex generator is controlled in accordance with an air density of the airflow to be measured, and the typical dimension D decreases when the air density is high.

12. An apparatus according to claim 10, wherein said movable unit constituting said vortex generator is arranged at a position at which the same air pressure of the airflow is to be measured, is connected to a sealed bellows by a coupling member, and is moved to vary the typical dimension D in correspondence with elongation/contraction of said bellows.

13. An apparatus according to claim 12, wherein said movable unit is moved in a direction to decrease the typical dimension D when said bellows is contracted, and is moved in a direction to increase the typical dimension D when said bellows is elongated.

14. An apparatus according to claim 7, wherein said front elements of said stationary and movable units comprise plate-like members, and said plate-like members, as said front elements, are moved in a vertically overlapped manner and have a flat surface against which the air flows.

* * * * *